UNITED STATES PATENT OFFICE.

RAYMOND WELCH TUNNELL, OF PHILADELPHIA, PENNSYLVANIA.

VEGETABLE GLUE OR ADHESIVE.

1,284,495.            Specification of Letters Patent.        Patented Nov. 12, 1918.

No Drawing.     Application filed December 22, 1917. Serial No. 208,462.

*To all whom it may concern:*

Be it known that I, RAYMOND W. TUNNELL, a citizen of the United States, and a resident of Philadelphia, in the county of Philadelphia and State of Pennsylvania, have invented a new and Improved Vegetable Glue or Adhesive, of which the following is a full, clear, and exact description.

My composition belongs to that large class of adhesives of vegetable origin produced from starch, and is characterized by the production of an improved adhesive from unhydrolyzed starch.

An object of the invention is to provide an adhesive which is suitable for all classes of work to which vegetable adhesives are applied.

Another object of the invention is to devise a method of obtaining the product which is inexpensive, as it eliminates the machinery necessary for hydrolyzing the starch, in addition to the labor connected therewith.

A further object of the invention is to provide a mixture mechanically prepared which, when treated with water, will produce a paste similar to, and acting substantially as, adhesives prepared from hydrolized starch-containing compounds.

I have discovered that if starches of different grades are mixed in certain proportions and thereto a salt is added, which is adapted to form an insoluble compound in the body of the starch after the same is treated with water, the resulting paste is in every respect and in action similar to hydrolyzed starches, particularly when certain kinds of cassava are blended in certain proportions.

The salts I prefer to use are those giving white, insoluble precipitates, so that the appearance of the paste is enhanced and the resulting precipitates are slimy or gelatinous and, therefore, tend to increase the adhesiveness and body of the paste, in addition increasing the waterproof qualities of the same due to the fact that they form precipitates in the water added to form the paste from the dry mixture.

If tapioca of low grade is mixed with tapioca of high grade and thereto a zinc or aluminum salt is added, preferably in the form of a chlorid, in proportions of one-tenth of one per cent. to one-quarter of one per cent., a mixture is formed which when treated with water results in a compound the adhesive quality of which is considerable and which has a high consistency. In place of adding the salt in dry form, a solution of same may be prepared in the water and the mixture of starch treated with that solution. The results are identical.

If eighty per cent. of a low grade tapioca is mixed with twenty per cent. of a high grade tapioca and a zinc chlorid, in dry form, and water added thereto, the zinc chlorid will go into solution. A reaction will take place between the zinc chlorid and the starch with the result that a zinc salt of the lactate or similar organic acid is formed which is insoluble and which will be distributed through the gelatinous body of the starch, the acid radical helping to gelatinize the starch. The resulting compound will be of high consistency and adhesiveness. Aluminum chlorid can be used in place of zinc chlorid with identical results. It is self-evident that if the chlorids are dissolved previously in water and then mixed with the starch the resulting compound will be identical to the result obtained when the starch, with the dry chlorids, is treated with water.

I claim:

An adhesive forming product consisting of eighty per cent. of low grade tapioca, twenty per cent. of high grade tapioca, and one-tenth to one-quarter of one per cent. by weight of zinc salt.

RAYMOND WELCH TUNNELL.